(12) United States Patent
Knoeppel

(10) Patent No.: US 11,851,069 B2
(45) Date of Patent: Dec. 26, 2023

(54) METHOD AND DEVICE FOR LOCATING A VEHICLE

(71) Applicant: DAIMLER AG, Stuttgart (DE)

(72) Inventor: Carsten Knoeppel, Filderstadt (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 119 days.

(21) Appl. No.: 17/609,125

(22) PCT Filed: Apr. 22, 2020

(86) PCT No.: PCT/EP2020/061241
§ 371 (c)(1),
(2) Date: Nov. 5, 2021

(87) PCT Pub. No.: WO2020/224970
PCT Pub. Date: Nov. 12, 2020

(65) Prior Publication Data
US 2022/0221291 A1    Jul. 14, 2022

(30) Foreign Application Priority Data

May 8, 2019   (DE) .................... 10 2019 003 238.1

(51) Int. Cl.
*B60W 40/06*    (2012.01)
*G01C 21/00*    (2006.01)
*B60W 40/12*    (2012.01)

(52) U.S. Cl.
CPC ........... *B60W 40/06* (2013.01); *B60W 40/12* (2013.01); *G01C 21/3822* (2020.08); *B60W 2520/16* (2013.01)

(58) Field of Classification Search
CPC ........... G01C 21/3476; G01C 21/3811; G01C 21/3822; G01C 21/30; B60W 40/06;
(Continued)

(56) References Cited

U.S. PATENT DOCUMENTS 3,580,978 A * 5/1971 Ebeling ..................... G09B 9/32
353/30
5,790,403 A * 8/1998 Nakayama ............. G06V 20/58
701/28
(Continued)

FOREIGN PATENT DOCUMENTS

CA          2787856 A1    11/2013
CN       102292249 A     12/2011
(Continued)

OTHER PUBLICATIONS

"Development of a multisensor road surveying measurement system;" Streiter et al.; International Multi-Conference on Systems, Signals & Devices (pp. 1-5); Jun. 4, 2012. (Year: 2012).*
(Continued)

*Primary Examiner* — Khoi H Tran
*Assistant Examiner* — Jorge O Peche
(74) *Attorney, Agent, or Firm* — PATENT PORTFOLIO BUILDERS PLLC

(57) ABSTRACT

A method for locating a vehicle involves detecting an elevation profile of a roadway of the vehicle and in which image features on the roadway are detected as landmarks and are compared with landmarks stored on a digital map. A transformation of the detected and/or stored landmarks into a common perspective performed to compare the landmarks. The transformation is carried out based on model parameters of a parametric model of the elevation profile of the roadway and a parametric model of a vehicle inclination. The model parameters are determined by determining an expected elevation profile of the roadway from the parametric models of the elevation profile and the vehicle inclination and minimizing a difference between the expected elevation profile and the detected elevation profile by varying the model parameters.

8 Claims, 3 Drawing Sheets

(58) Field of Classification Search
CPC ............ B60W 40/12; B60W 2420/42; B60W 2520/16; B60W 2552/25; G06V 20/56
See application file for complete search history.

(56) References Cited

U.S. PATENT DOCUMENTS

| | | | | |
|---|---|---|---|---|
| 5,947,861 | A * | 9/1999 | Nobumoto | F16H 61/66254 477/37 |
| 6,128,569 | A * | 10/2000 | Fukushima | B60T 8/17551 701/72 |
| 6,543,278 | B1 * | 4/2003 | Kogure | B60T 8/172 73/146 |
| 8,387,439 | B2 | 3/2013 | Jiang et al. | |
| 9,008,876 | B2 * | 4/2015 | Pinto | B60L 50/00 180/312 |
| 9,109,907 | B2 * | 8/2015 | Park | G01C 21/30 |
| 9,520,064 | B2 * | 12/2016 | Tsuda | B60W 30/16 |
| 9,753,144 | B1 * | 9/2017 | Jafari | G01C 21/165 |
| 9,902,228 | B2 | 2/2018 | Göhrle et al. | |
| 10,922,969 | B2 * | 2/2021 | Song | G05D 1/0088 |
| 11,054,827 | B2 * | 7/2021 | Gdalyahu | G01C 21/3407 |
| 11,391,575 | B2 * | 7/2022 | Li | G01S 13/89 |
| 2002/0013651 | A1 * | 1/2002 | Weiberle | B60T 8/172 180/197 |
| 2003/0051560 | A1 * | 3/2003 | Ono | B62D 15/02 73/862.08 |
| 2003/0182025 | A1 * | 9/2003 | Tseng | B60W 40/112 701/1 |
| 2005/0270224 | A1 * | 12/2005 | Silberman | G05D 1/0646 342/65 |
| 2006/0074541 | A1 * | 4/2006 | Ono | B60T 8/172 701/80 |
| 2007/0067085 | A1 * | 3/2007 | Lu | B60T 8/24 340/440 |
| 2007/0129873 | A1 * | 6/2007 | Bernzen | F02D 41/021 701/96 |
| 2007/0154068 | A1 * | 7/2007 | Stein | G01B 11/026 348/148 |
| 2009/0012709 | A1 * | 1/2009 | Miyazaki | G01C 21/3822 701/514 |
| 2010/0209881 | A1 * | 8/2010 | Lin | G09B 19/167 434/66 |
| 2010/0209882 | A1 * | 8/2010 | Lin | G09B 19/167 434/66 |
| 2010/0209883 | A1 * | 8/2010 | Chin | G09B 19/167 434/65 |
| 2010/0209884 | A1 * | 8/2010 | Lin | G09B 19/167 434/66 |
| 2010/0209885 | A1 * | 8/2010 | Chin | G09B 19/167 434/66 |
| 2010/0209886 | A1 * | 8/2010 | Lin | G09B 19/167 434/66 |
| 2010/0209887 | A1 * | 8/2010 | Chin | G09B 19/167 434/66 |
| 2010/0209888 | A1 * | 8/2010 | Huang | G09B 19/167 434/66 |
| 2010/0209889 | A1 * | 8/2010 | Huang | G09B 19/167 434/66 |
| 2010/0209890 | A1 * | 8/2010 | Huang | G09B 19/167 434/66 |
| 2010/0209891 | A1 * | 8/2010 | Lin | G09B 9/05 434/66 |
| 2010/0209892 | A1 * | 8/2010 | Lin | G09B 19/167 434/71 |
| 2010/0211270 | A1 * | 8/2010 | Chin | B60W 40/09 701/44 |
| 2011/0004359 | A1 | 1/2011 | Kretschmann et al. | |
| 2011/0006903 | A1 * | 1/2011 | Niem | B60K 28/066 340/576 |
| 2011/0044507 | A1 * | 2/2011 | Strauss | B60W 40/04 382/103 |
| 2011/0087398 | A1 * | 4/2011 | Lu | B60G 17/019 701/31.4 |
| 2011/0226036 | A1 * | 9/2011 | Jiang | B60G 17/01908 73/1.37 |
| 2012/0016646 | A1 * | 1/2012 | Takenaka | B60T 8/172 703/2 |
| 2013/0144476 | A1 * | 6/2013 | Pinto | B60T 8/17555 903/930 |
| 2013/0218396 | A1 * | 8/2013 | Moshchuk | B60W 50/08 701/25 |
| 2013/0238164 | A1 * | 9/2013 | Matsuda | G06F 17/00 701/1 |
| 2014/0032100 | A1 * | 1/2014 | Park | G01C 21/30 701/446 |
| 2014/0043473 | A1 * | 2/2014 | Gupta | G06T 7/80 348/135 |
| 2014/0085469 | A1 * | 3/2014 | Sakano | G06T 7/80 348/148 |
| 2014/0195112 | A1 * | 7/2014 | Lu | B60G 17/015 703/2 |
| 2016/0031287 | A1 * | 2/2016 | Guest | B60G 17/0165 701/37 |
| 2019/0263414 | A1 * | 8/2019 | Åsbogård | B60W 40/076 |
| 2019/0371170 | A1 * | 12/2019 | Song | G05D 1/0257 |
| 2020/0180692 | A1 * | 6/2020 | Hara | G06F 16/9537 |
| 2020/0257291 | A1 * | 8/2020 | Zhang | B62D 6/003 |
| 2020/0318971 | A1 * | 10/2020 | Mori | B60W 30/04 |
| 2021/0046935 | A1 * | 2/2021 | Mizoguchi | B60W 30/045 |
| 2021/0323606 | A1 * | 10/2021 | Namba | B62D 6/002 |
| 2021/0370958 | A1 * | 12/2021 | Moshchuk | B60W 40/105 |
| 2022/0153070 | A1 * | 5/2022 | Singuru | B60C 23/061 |
| 2022/0194377 | A1 * | 6/2022 | Otanez | B60W 40/105 |
| 2022/0221291 | A1 * | 7/2022 | Knoeppel | G01C 21/3476 |
| 2022/0274602 | A1 * | 9/2022 | Zarringhalam | B60W 40/072 |
| 2022/0281456 | A1 * | 9/2022 | Giovanardi | G01S 7/4021 |
| 2022/0324421 | A1 * | 10/2022 | Giovanardi | B60W 40/06 |
| 2023/0041499 | A1 * | 2/2023 | Uestuenel | B60W 40/076 |
| 2023/0104727 | A1 * | 4/2023 | Oda | B60W 40/105 701/93 |

FOREIGN PATENT DOCUMENTS

| | | | | |
|---|---|---|---|---|
| CN | 103162694 | A * | 6/2013 | ............ G01C 21/30 |
| CN | 103661352 | A * | 3/2014 | ............ B60W 40/06 |
| CN | 103661393 | A * | 3/2014 | ............... B60T 8/24 |
| CN | 105393084 | A | 3/2016 | |
| CN | 111688715 | A * | 9/2020 | ............ B60W 40/10 |
| CN | 113442932 | A * | 9/2021 | |
| CN | 113752996 | A * | 12/2021 | ............... B60T 7/12 |
| CN | 109353276 | B * | 2/2022 | ............... B60R 1/00 |
| DE | 102006049118 | A1 | 4/2008 | |
| DE | 102007004606 | A1 | 7/2008 | |
| DE | 102013002889 | A1 * | 8/2014 | .......... B60W 40/072 |
| DE | 102013018924 | A1 | 5/2015 | |
| DE | 112014001807 | T5 * | 1/2016 | .......... B60W 40/076 |
| DE | 102016011849 | A1 * | 6/2017 | |
| DE | 102017107921 | A1 * | 10/2017 | ............ B60T 8/1887 |
| DE | 102017216238 | A1 * | 3/2019 | ............ G01C 21/30 |
| DE | 112018000107 | | * 5/2019 | ............... B60R 1/00 |
| DE | 102019216722 | A1 * | 5/2021 | |
| EP | 0678731 | A1 * | 10/1995 | |
| KR | 1209062 | B1 * | 12/2012 | .......... G01C 21/005 |
| KR | 20220039038 | A * | 3/2022 | |
| WO | 2018059735 | A1 | 4/2018 | |
| WO | WO-2018059735 | A1 * | 4/2018 | |
| WO | WO-2021091914 | A1 * | 5/2021 | ............ B60W 40/06 |

OTHER PUBLICATIONS

"Dynamic position calibration by road structure detection;" Speth et al.; 2015 IEEE International Conference on Vehicular Electronics and Safety (ICVES) (pp. 104-109); Mar. 4, 2016. (Year: 2016).*

"Vehicle attitude estimation in adverse weather conditions using a camera, a GPS and a 3D road map;" Belaroussi et al. 2011 IEEE Intelligent Vehicles Symposium (IV) (pp. 782-787); Jul. 25, 2011 (Year: 2011).*

Hwangbo et al.; "Integration of Orbital and Ground Image Networks for the Automation of Rover Localization;" ASPRS 2009

(56) References Cited

OTHER PUBLICATIONS

Annual Conference; Mar. 9-13, 2009; Baltimore, MD, USA; https://www.asprs.org/a/publications/proceedings/baltimore09/0040.pdf.
International Search Report dated Jun. 30, 2020 in related/corresponding International Application No. PCT/EP2020/061241.
English translation of Office Action dated Feb. 19, 2020 in related/corresponding DE Application No. 10 2019 003 238.1.
English translation of Written Opinion dated Jun. 30, 2020 in related/corresponding International Application No. PCT/EP2020/061241.
Response dated Mar. 13, 2020, filed responsvie to Office Action dated Feb. 19, 2020 in related/corresponding DE Application No. 10 2019 003 238.1, including English translation.
Office Action dated Sep. 29, 2023 in related/corresponding CN Application No. 202080034165.4.

* cited by examiner

METHOD AND DEVICE FOR LOCATING A VEHICLE

BACKGROUND AND SUMMARY OF THE INVENTION

Exemplary embodiments of the invention relate to a method for locating a vehicle, a device for locating a vehicle, and a vehicle having such a device.

From the prior art, it is known to compare and correlate data detected by sensors about objects in the environment of a vehicle with the information stored on a digital map, which has features of the object itself and position information associated with the respective object, in order to determine a position of the vehicle with the aid of the digital map. By way of example, WO 2018/059735 A1 relates to a method for the self-localization of a vehicle, in which images of the vehicle environment are captured by means of at least one image capturing unit and image features are extracted from the ambient images and superimposed on environment features stored on a digital environment map.

Exemplary embodiments of the invention are directed to improving localization of a vehicle, i.e., the determination of a position of a vehicle.

In the method for locating a vehicle according to the invention, an elevation profile of a roadway of the vehicle is detected. For locating, image features on the roadway are detected as landmarks and compared with landmarks stored on a digital map. To make the landmarks comparable, the detected and/or stored landmarks are transformed into a common perspective.

Advantageously, the landmarks stored on the digital map are transformed into the perspective of the detected landmarks, i.e., into the perspective of the vehicle. Through this transformation, the landmarks stored on the map are virtually projected onto the roadway. Virtually means that the projected landmarks are only calculated. Through the projection, the stored landmarks are thus calculated back into a form as they would be seen from the vehicle and are thus comparable with the detected landmarks.

Alternatively, the detected landmarks can also be transformed into the perspective of the stored landmarks, i.e., into the perspective of the digital map. The perspective of the digital map is the perspective of a top view, i.e., a view from above. Through this transformation, the detected landmarks are thus virtually projected into the plane of the digital map. The detected landmarks are thus calculated back into a form as they would have to be stored on the digital map and are thus comparable with the landmarks stored on the map.

In accordance with the invention, the transformation of the detected and/or stored landmarks is performed based on model parameters of a parametric model of the elevation profile of the roadway and a parametric model of a vehicle inclination of the vehicle. The model parameters are determined by determining an expected elevation profile of the roadway from the parametric models of the elevation profile and the vehicle inclination and minimizing a difference between the expected elevation profile and the detected elevation profile by varying the model parameters.

Preferably, the method according to the invention is carried out with the following steps:
  detecting the roadway in the environment of the vehicle with a first sensor unit of the vehicle,
  determining the detected elevation profile of the roadway based on first data of the first sensor unit,
  determining the model parameters of the parametric models of the elevation profile of the roadway and of the vehicle inclination,
  recording second data representing the detected landmarks by the first sensor unit or by a second sensor unit,
  comparing the detected landmarks with the landmarks stored on the digital map after transforming the detected and/or stored landmarks into the common perspective, and
  determining a position of the vehicle from the comparison of landmarks.

The vehicle may be a car, lorry, bus, rail vehicle or aircraft.

Preferably, the parametric model of the vehicle inclination is defined such that it describes a deflection of a longitudinal axis and transverse axis of the vehicle with respect to a reference plane, in particular a horizontal plane.

Preferably, the parametric model of the vehicle inclination is generated based on a tangent function of a pitch angle of the vehicle around a transverse direction and a tangent function of a roll angle of the vehicle around a longitudinal direction. The pitch angle and the roll angle are thereby the model parameters of the parametric model of the vehicle inclination.

The longitudinal direction and the transverse direction are defined in particular in a coordinate system that moves with a center of gravity of the vehicle, wherein the longitudinal direction and the transverse direction are located in a horizontal plane, and the longitudinal direction moves with a yaw angle of the vehicle, i.e., azimuth with respect to the earth, while the transverse direction remains perpendicular to the longitudinal direction. The roll angle as well as the pitch angle of the vehicle in each case are therefore defined in particular with respect to this horizontal plane.

When determining the model parameters, a plurality of measurement points from the first sensor data is preferably used to determine a respective elevation of the elevation profile at the measurement points of the roadway. This plurality of respective elevations is compared to a plurality of points on the expected elevation profile, such that it results in a system of equations, wherein the difference between the detected elevation profile and the expected elevation profile is reduced by minimization, and ideally becomes zero by adjusting the model parameters accordingly. This corresponds to a search for such model parameters for which the difference from the detected elevation profile and the expected elevation profile becomes minimal based on the plurality of measurement points considered.

The reason why the expected elevation profile is generated from the parametric model of the elevation profile of the roadway and the parametric model of the vehicle inclination is that the parametric model is defined relative to the roadway, wherein the vehicle inclination, i.e., the pitch angle and the roll angle, have an influence on what elevation is actually detected by the first sensor unit of a respective point on the roadway. The theoretically expected elevation profile, which indicates an expectation of the measurement from the first sensor unit, thus takes into account this influence of the pitch angle and the roll angle. Thus, not only are the model parameters adjusted, but the roll angle and the pitch angle are also determined such that the expected elevation profile and the actual detected elevation profile match as closely as possible.

The image features on the roadway are, in particular, markings that are applied to the roadway in the environment of the vehicle, for example lane markings, stop lines, direction arrows, characters, etc. However, it is also conceivable that other features present on the roadway are detected and used as detected landmarks.

It is an advantageous effect of the invention that, when locating a position of the vehicle, i.e., locating the vehicle by comparing the landmarks, it is taken into account that roads are not always flat. In particular, roads may have a curved or distorted or bent surface relative to a reference ellipsoid of the earth. In addition to this, due to the spring mounting of the vehicle, the vehicle may have a pitch angle or also a roll angle with respect to this reference ellipsoid, wherein these orientation angles are also taken into account in the transformation. The transformation of the detected and/or stored landmarks into a common perspective ensures that the detected and stored landmarks are comparable with each other (because the landmarks stored on the map are typically defined by looking at the environment from above, while the detected landmarks are detected from the perspective of the vehicle, in particular from the perspective of the first or second sensor unit). In this respect, the comparison of the landmarks is corrected for errors caused by the curved surface of the road and also by the vehicle inclination (pitch angle and roll angle). The detected landmarks can thus be assigned with better accuracy to the landmarks stored on the digital map, which advantageously enables more precise locating of the vehicle with the aid of the landmarks stored on the digital map.

According to an advantageous embodiment, the first sensor unit is the same as the second sensor unit, i.e., the roadway and the landmarks are detected with the same sensor unit. Preferably, a stereo camera unit is used for both the first sensor unit and the second sensor unit. Further advantageously, the determination of the detected elevation profile of the roadway based on the first data as well as the comparison of the second data with the landmarks stored on the digital map can be performed by one and the same data set of first data and second data in one go. If the first data are equal to the second data, one image data set of the stereo camera unit can be used for both purposes. This has the advantage that the method can be executed with relatively little sensor data and with relatively little computational effort.

According to a further advantageous embodiment, the parametric model of the elevation profile of the roadway comprises a parametrizable curve for the longitudinal direction and a parametrizable curve for the transverse direction.

According to a further advantageous embodiment, the parametrizable curve for the longitudinal direction is a second-order polynomial having two model parameters, and the parametrizable curve for the transverse direction is a fourth-order polynomial having four model parameters.

The second-order polynomial is preferably represented as: $H(x)=ex^2+fx$, wherein e and f are the model parameters of the polynomial for the longitudinal direction, which are determined, wherein x is a coordinate in the longitudinal direction.

The fourth-order polynomial is preferably represented as $H(y)=ay^4+by^3+cy^2+dy$, wherein a, b, c, and d are the model parameters of the polynomial for the transverse direction, which are determined, wherein y is coordinate in the transverse direction.

The parametric model of the vehicle inclination is preferably expressed, based on the tangent function of the pitch angle and the tangent function of the roll angle as the term $H_e$, by:
$H_e = x \cdot \tan(\text{pitch angle}) + y \cdot \tan(\text{roll angle})$, wherein pitch angle and roll angle are the model parameters to be determined, x is the coordinate in the longitudinal direction and y is the coordinate of the transverse direction.

According to a further advantageous embodiment, minimizing the difference between the expected elevation profile and the detected elevation profile to determine the model parameters is performed by means of one of the following processes and methods:

Gauss-Newton method,

Levenberg-Marquard method, gradient-based search method, quadratic optimization, training of a neural network, genetic or evolutionary algorithm.

According to a further advantageous embodiment, a time series of the pitch angle and/or the roll angle is used to calibrate the first sensor unit and/or the second sensor unit respectively.

According to a further advantageous embodiment, at least one of the following is used for the first sensor unit and/or the second sensor unit:

lidar unit, radar unit, stereo camera unit, ultrasonic sensor unit.

Another aspect of the invention relates to a device for determining a position of a vehicle, having:

a first sensor unit of the vehicle, wherein the first sensor unit is designed to detect a roadway in an environment of the vehicle, a computing unit adapted to determine a detected elevation profile of the roadway based on first data from the first sensor unit, and designed to determine model parameters of a parametric model of the elevation profile of the roadway and a parametric model of the vehicle inclination by minimizing a difference between an expected elevation profile and the detected elevation profile, wherein the expected elevation profile is generated from the parametric models of the elevation profile and the vehicle inclination, a second sensor unit designed to record second data representing the detected landmarks, wherein the computing unit is further adapted to compare the detected landmarks with landmarks stored on a digital map, wherein the detected and/or stored landmarks are converted to a common perspective by a transformation to ensure comparability of the landmarks, and wherein the transformation is performed based on the determined model parameters of the parametric models of the elevation profile and the vehicle inclination, and wherein the computing unit is designed to determine a position of the vehicle from the comparison of the landmarks.

Another aspect of the invention relates to a vehicle having a device as described above and below.

Advantages and preferred developments of the proposed device emerge from an analogous and corresponding transfer of the statements made above in connection with the proposed method.

Further advantages, features and details emerge from the following description, in which—optionally with reference to the drawing—at least one exemplary embodiment is described in detail. Identical, similar and/functionally identical parts are provided with the same reference numerals.

BRIEF DESCRIPTION OF THE DRAWING FIGURES

Here are shown:

FIG. 1 schematically a method for determining a position of a vehicle according to an exemplary embodiment of the invention, FIG. 2 a roadway having a vehicle located thereon in relation to the execution of the method according to the exemplary embodiment of FIG. 1, FIG. 3 a grid of measurement points on a roadway in relation to the execution of the method according to the exemplary embodiment of FIG. 1, and FIG. 4 a vehicle having a device according to a further exemplary embodiment of the invention.

The representations in the figures are schematic and not to scale.

DETAILED DESCRIPTION

FIG. 1 shows a method for determining a position of a vehicle 10, i.e., for locating the vehicle. Certain details of this method or of the situation to which the method is applied can be seen from FIG. 2 and FIG. 3, which also refer to the embodiments of FIG. 1.

In the first step S1 of the method, a roadway in an environment of the vehicle 10 is detected with a first sensor unit 3 of the vehicle 10, the first sensor unit 3 being designed as a stereo camera unit. Next, a detected elevation profile of the roadway is determined based on the first data supplied by the stereo camera unit 3 (step S2). This is done for a plurality of measurement points from the image of the stereo camera unit 3, as depicted in FIG. 3. Here, the roadway is curved around a central line of the roadway, such that markings on the right side of the roadway appear distorted downwards. For the plurality of measurement points, determining S3 model parameters of a vehicle inclination $H_{xy}$ of the elevation profile of the roadway and of model parameters of a vehicle inclination $H_e$ of the vehicle 10 ensues by minimizing a difference between an expected elevation profile $H_{the}$ and the detected elevation profile. The expected elevation profile $H_{the}$ is generated by summing the parametric model $H_{xy}$ of the elevation profile of the roadway and the parametric model $H_e$ of the vehicle inclination:

$$H_{the}=H_{xy}+H_e.$$

The parametric model of the elevation profile of the roadway is composed of a second-order polynomial H(x) having two model parameters e, f for the longitudinal direction x, and of a fourth-order polynomial H(y) having four model parameters a, b, c, d for the transverse direction y:

$$H(y)=ay^4+by^3+cy^2+dy;$$

$$H(x)=ex^2+fx.$$

The parametric model of vehicle inclination describes the inclination of the vehicle relative to a reference plane, for example relative to a horizontal plane. It is defined as a quantity $H_e$ based on a tangent function of a pitch angle of the vehicle around a transverse direction and a tangent function of a roll angle of the vehicle around a longitudinal direction as follows:

$$H_e=x*\tan(\text{pitch angle})+y*\tan(\text{roll angle}).$$

Here, pitch angle and roll angle refer to the model parameters of the parametric model of the vehicle inclination, x represents the coordinate in longitudinal direction and y represents the coordinate in transverse direction.

The expected elevation profile $H_{the}$ is formed based on the parametric models $H_{xy}$, $H_e$ by summing the models:

$$H_{the}=H_{xy}+H_e=H(x)+H(y)+H_e.$$

For a plurality of points assigned to the roadway and the respective detected heights $H_{sen}$ at a respective measurement point of the detected elevation profile, it is thus obtained:

$$r_1 = H_{the}(x_1, y_1) - H_{sen}(x_1, y_1)$$
$$r_2 = H_{the}(x_2, y_2) - H_{sen}(x_2, y_2)$$
$$r_3 = H_{the}(x_3, y_3) - H_{sen}(x_3, y_3)$$
...

Minimizing the difference between the expected elevation profile and the detected elevation profile, expressed by the residuals $r_1, r_2, r_3$, is done to determine the model parameters by means of the Levenberg-Marquard method, such that the model parameters a, b, c, d, e, f, pitch angle, and roll angle are obtained. In this way, a mathematical description of the current elevation profile and the current vehicle information is obtained.

This is followed by the detection S4 of second data on objects from the environment of the vehicle 10 by the second sensor unit 5, that is, the stereo camera unit, which corresponds to the first sensor unit 3. The second data represent the detected landmarks. Furthermore, the comparison S5 of the second data, i.e., the detected landmarks, with landmarks stored on a digital map follows, wherein the stored landmarks are transformed into the perspective of the detected landmarks before the comparison. The transformation is based on the determined model parameters of the parametric models of the elevation profile and the vehicle inclination. Its purpose is to transform the stored landmarks into a form in which they can be compared with the detected landmarks. Finally, determining S6 a position of the vehicle 10 from the comparison of detected landmarks with the stored landmarks transformed into the same perspective occurs. It is also conceivable that, in step S5, the detected landmarks are transformed into the perspective of the stored landmarks before being compared. Accordingly, in step 6, the position is then determined from the comparison of the transformed detected landmarks with the stored landmarks.

Figure 1:
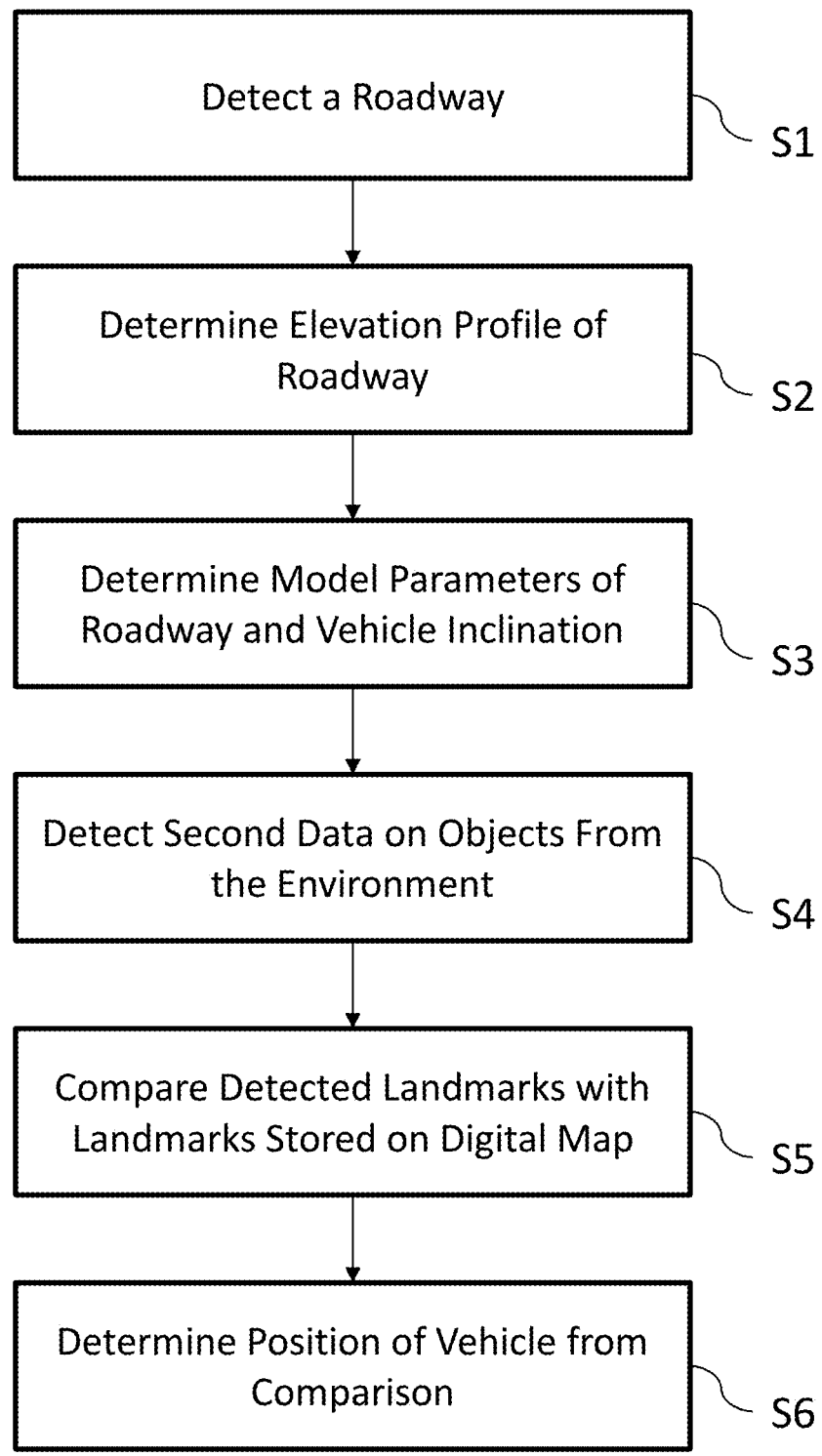
Figure 2:
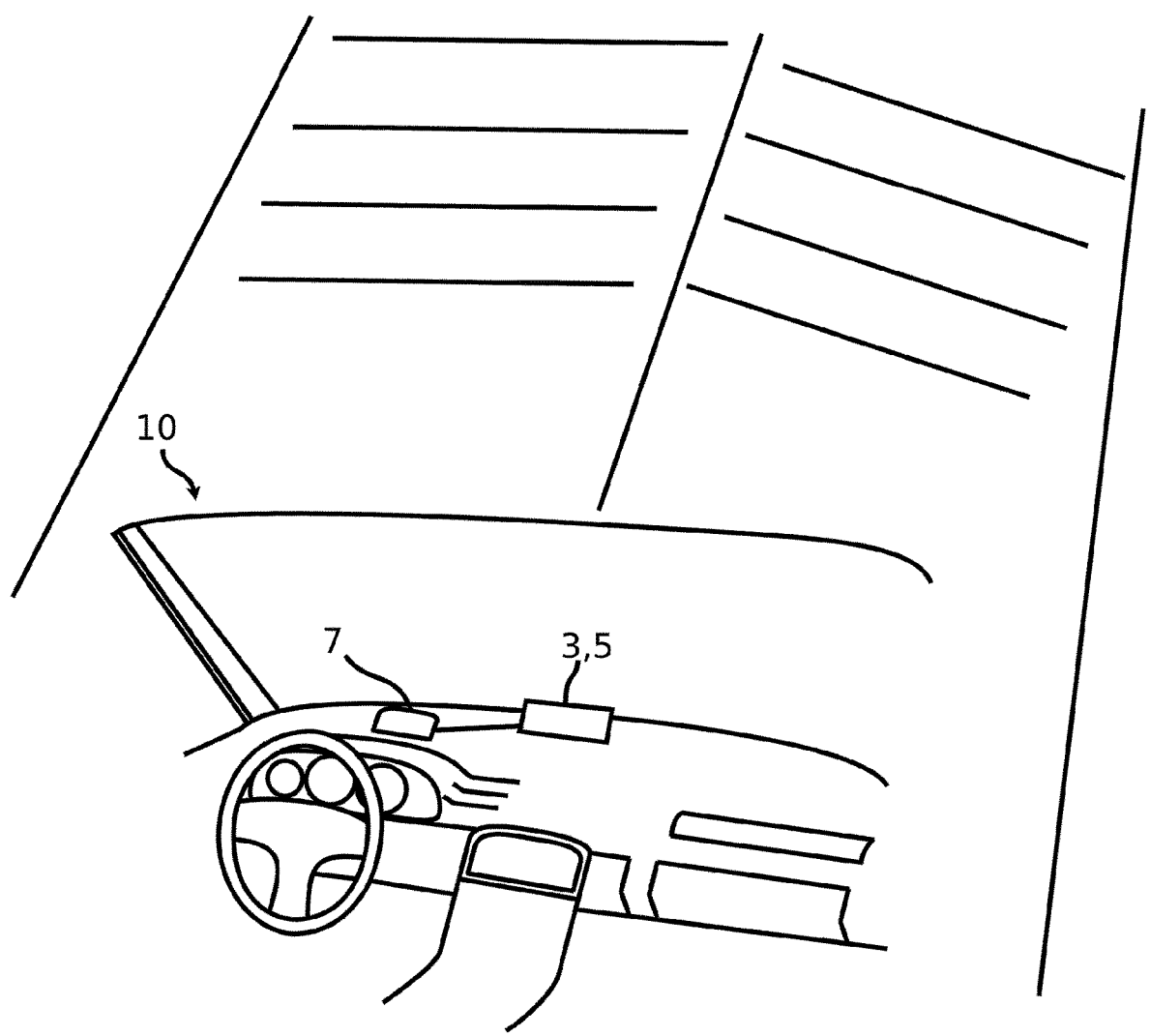
FIG. 2 shows, in addition to FIG. 1, the kinked course of the road on which the detected landmarks appear kinked downwards from the point of view of the stereo camera unit 3.
Figure 3:
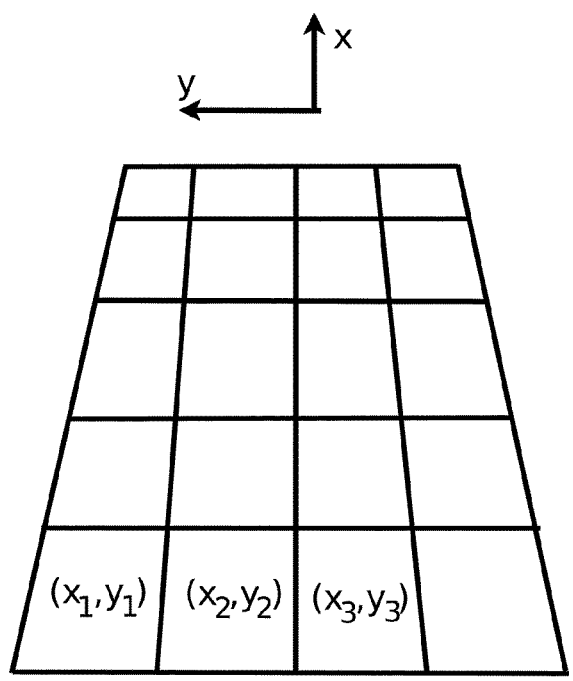
FIG. 3 shows a possible grid of measurement points for comparing the expected with the measured elevation profile, as well as the orientation of the longitudinal direction x and the transverse direction y.
Figure 4:
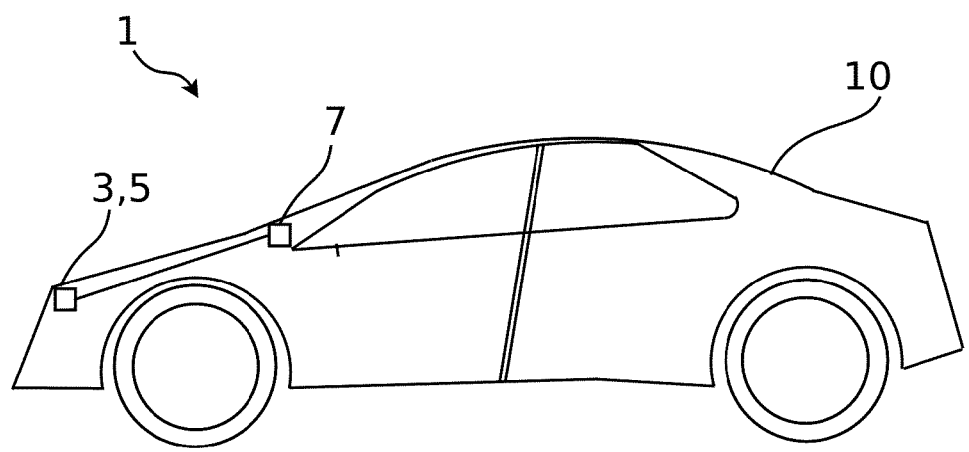

FIG. 4 shows a vehicle 10 having a device 1, wherein the device 1 serves to determine a position of a vehicle 10, having:

a first sensor unit 3 of the vehicle 10, wherein the first sensor unit 3 is designed to detect a roadway in an environment of the vehicle 10, a computing unit 7, configured to determine a detected elevation profile of the roadway based on first data from the first sensor unit 3, and designed to determine model parameters of a parametric model of the elevation profile of the roadway and a parametric model of the vehicle inclination by minimizing a difference between an expected elevation profile and the detected elevation profile, wherein the expected elevation profile is generated from the parametric models of the elevation profile and the vehicle inclination, a second sensor unit 5, designed to detect second data on objects from the environment of the vehicle 10 representing the detected landmarks, wherein the computing unit 7 is further designed to compare the detected landmarks with landmarks stored on a digital map, wherein the detected or stored landmarks are converted to the same perspective by a transformation to enable the comparison of the landmarks, and wherein the transformation occurs based on the determined model parameters of the elevation profile and the vehicle inclination, and wherein the computing unit 7 is designed to determine a position of the vehicle 10 from the comparison of the landmarks.

Although the invention has been further illustrated and explained in detail by preferred exemplary embodiments, the invention is not limited by the disclosed examples and other variations can be derived therefrom by those skilled in the art without departing from the scope of protection of the invention. It is therefore clear that a plurality of possible variations exist. It is also clear that exemplary embodiments mentioned are really only examples, which are not to be understood in any way as limiting, for example, the scope of protection, the possible applications or the configuration of the invention. Rather, the preceding description and the description of figures enables the person skilled in the art to implement the exemplary embodiments in a concrete manner, wherein the person skilled in the art, being aware of the disclosed idea of the invention, can make a variety of changes, for example with respect to the function or the arrangement of individual elements mentioned in an exemplary embodiment, without leaving the scope of protection defined by the claims and their legal equivalents, such as further explanations in the description.

The invention claimed is:

1. A method for locating a vehicle on a roadway, the method comprising:
   detecting, by a first sensor unit of the vehicle, the roadway in an environment of the vehicle to generate a plurality of measurement points;
   detecting an elevation profile of the roadway in the environment of the vehicle based on the plurality of measurement points;
   determining a set of parametric models, which includes a first and second parametric model, wherein
      the first parametric model is of the detected elevation profile of the roadway and comprises (1) a parameterizable curve for a longitudinal direction of the detected elevation profile, and (2) a parametrizable curve for a transverse direction of the detected elevation profile, and
      the second parametric model is of an inclination of the vehicle and has pitch angle and roll angle as parameters;
   determining an expected elevation profile of the roadway based on the set of parametric models;
   determining parameters of the first and second parametric models, including the pitch angle and roll angle parameters, by minimizing a difference between the expected elevation profile and the detected elevation profile;
   detecting, by a second sensor unit, landmarks in the environment of the vehicle;
   transforming, using the determined parameters of the first and second parametric models, one of the detected landmarks or the landmarks stored on the digital map into a common perspective with the other one of the detected landmarks or the landmarks stored on the digital map; and
   comparing, using the common perspective, the detected landmarks with landmarks stored on the digital map to determine a position of the vehicle; and
   determining a position of the vehicle based on the comparison of the detected landmarks with the information from the digital map.

2. The method of claim 1, wherein
   the parametrizable curve for the longitudinal direction is a second-order polynomial having two model parameters, and
   the parametrizable curve for the transverse direction is a fourth-order polynomial having four model parameters.

3. The method of claim 1, wherein the parametric model of the vehicle inclination describes a deflection of a longitudinal axis and transverse axis of the vehicle with respect to a contact area of the vehicle with the roadway.

4. The method of claim 3, wherein the parametric model of the vehicle inclination is generated based on a tangent function of a pitch angle of the vehicle and a tangent function of a roll angle of the vehicle.

5. The method of claim 4, wherein a time series of the pitch angle and/or the roll angle is used to calibrate the first sensor and/or the second sensor, respectively.

6. The method of claim 1, wherein the first sensor unit or the second sensor unit comprises at least one of:
   lidar unit,
   radar unit,
   stereo camera unit, and
   ultrasonic sensor unit.

7. The method of claim 1, wherein the first sensor unit and the second sensor unit are a same sensor unit.

8. The method of claim 7, wherein the same sensor unit is a stereo camera.

* * * * *